United States Patent
Kalajan

(10) Patent No.: US 6,304,908 B1
(45) Date of Patent: *Oct. 16, 2001

(54) MECHANISM FOR DELIVERING A MESSAGE BASED UPON A SOURCE ADDRESS

(75) Inventor: Kevin E. Kalajan, Redwood City, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/364,273

(22) Filed: Jul. 29, 1999

Related U.S. Application Data

(63) Continuation of application No. 08/929,162, filed on Sep. 12, 1997, now Pat. No. 6,006,258.

(51) Int. Cl.[7] .................................................. G06F 15/16
(52) U.S. Cl. ............................................................ 709/229
(58) Field of Search ..................................... 370/389, 392; 709/220, 224, 330, 101, 227, 229, 226, 223, 225; 713/201

(56) References Cited

U.S. PATENT DOCUMENTS

| 5,142,622 |   | 8/1992  | Owens ................................. 709/227 |
| 5,428,771 |   | 6/1995  | Daniels et al. ....................... 709/101 |
| 5,699,513 | * | 12/1997 | Feigen et al. ......................... 713/201 |
| 5,856,974 |   | 1/1999  | Gervais et al. ....................... 370/392 |
| 5,878,040 | * | 3/1999  | Peirce, Jr. et al. .................. 370/389 |
| 5,892,903 | * | 4/1999  | Klaus ................................... 713/201 |
| 5,978,568 | * | 11/1999 | Abraham et al. .................... 709/224 |
| 6,070,187 | * | 5/2000  | Subramaniam et al. ............. 709/220 |
| 6,128,298 | * | 10/2000 | Wootton et al. ..................... 370/392 |
| 6,134,603 | * | 10/2000 | Jones et al. ......................... 709/330 |

* cited by examiner

Primary Examiner—Zarni Maung
Assistant Examiner—Jungwon Chang
(74) Attorney, Agent, or Firm—Hickman Palermo Truong & Becker LLP; Bobby K. Truong

(57) ABSTRACT

A method for delivering a message unit to a destination network resource within a transport communications layer includes the steps of configuring a mapping to the destination network resource based upon a source address of the message unit, and sending the message unit to the destination network resource based upon the mapping.

21 Claims, 6 Drawing Sheets

FIG. 3

| SOURCE IP ADDRESS (OR SOURCE HOST NAME) | DESTINATION IP ADDRESS (OR DESTINATION HOST NAME) | DESTINATION PORT # (OR SERVICE NAME) |
|---|---|---|
| CLIENT A (14a) | HOST 1 (30a) | HOST PORT (31a) |
| CLIENT B (14b) | HOST 2 (30b) | HOST PORT (31b) |
| CLIENT C (14c) | HOST 3 (30c) | HOST PORT (31c) |
| | | |
| | | |
| | | |
| | | |

MECHANISM FOR DELIVERING A MESSAGE BASED UPON A SOURCE ADDRESS

This application is a continuation of U.S. patent application Ser. No. 08/929,162, filed Sep. 12, 1997, now U.S. Pat. No. 6,006,258, which is incorporated by reference in its entirety herein.

BACKGROUND

The present invention relates generally to electronic communications.

Networks provide communication sessions between clients and servers where, generally speaking, clients request information provided by servers. Some networks provide a high degree of security, so that messages passing between clients and servers are protected from unauthorized interception, reading, or tampering. Other networks, particularly more public networks such as the Internet, do not themselves necessarily protect from unauthorized reception of messages. Communications sessions and messages can be encoded to lend a degree of protection.

In addition, servers on public networks are vulnerable to discovery by unauthorized users, who can try to "hack" into such servers to obtain otherwise confidential information. Fire walls have been developed which help protect against unwanted intruders. Users, after logging onto a public network server, can be identified by any of a number of schemes (e.g., passwords), and then be transferred to other servers to access more sensitive information.

Network clients, especially Internet clients, often access the Internet through routers, or proxies. For example, a network client may be a particular user on a local area network (LAN). The network client may not have a valid Internet address, but may have a valid TCP/IP address (certain ranges of IP addresses are called "private" or "invalid" addresses and can be used within an organization's LAN but do not work over the Internet). Nonetheless, the network client can send and receive messages via the Internet by having those messages communicated through a device which does have a valid Internet address. For example, e-mail clients can access e-mails sent and received via the Internet from their e-mail server attached to their LAN, which in turn can attach to an Internet server which has a valid IP address and is attached to the Internet. The Internet has protocols (e.g., IMAP) for constructing and addressing e-mail messages so that e-mail clients properly receive their e-mail.

Computer users may also desire to access information that exists on particular computers attached to a LAN. One method for doing so requires a direct connection between the computer user and the LAN resource. For example, an employee can directly call (via a modem) a LAN computer that has a dedicated telephone port. A number of remote access applications provide for such connections. Such remote access applications allow the employee to remotely control and view the operations of a work computer, e.g., the employee's desktop computer, or a special computer having access to common LAN files at work.

However, if the employee wishes to have more flexible access to a LAN resource, for example, by using an existing remote access application but over the Internet instead of through a dedicated phone connection, there are some difficulties. Apart from securing the communication session itself (by, e.g., encryption), typical LAN resources do not have their own, Internet-acceptable, IP addresses. For example, an employee's LAN computer might have a LAN address of "10.0.0.3." Should message packets be sent to or from that LAN computer with that address, typical Internet routers will drop them as having improper IP addresses.

One might try using some form of network address translation (NAT), which operates at the IP layer, to translate improper LAN addresses to some other arbitrary proper IP address, and back again. However, such a method would require a translation of each message packet's address, a recalculation of the checksum of the packet, and then a rewriting of the packet for delivery.

Even if a LAN resource has a proper IP address, it might not be desirable to make it known. For example, a firm might want several clients to have access to subsets of information applicable to each client separately, but not give that client access to other clients' information. The firm might put the information on a common Internet server, behind a firewall, and allocate client access by Uniform Resource Locator (URL): e.g., one client accesses information at http:// . . . //client A, another client at http:// . . . //client B. However, it can be difficult to develop a sufficiently complex set of different URLs for a variety of clients that is not also susceptible to someone figuring out its organization and accessing protected data.

LAN administrators may not want to give a LAN resource its own IP address, but also may not want to give others (for example, clients) network address translation information, since that information can include sensitive specifics about the LAN configuration. Also, administrators may not want any information about the location of a particular resource sent through the Internet, to lessen the chance others might locate the resource without authorization and try to break into it.

SUMMARY

In general, in one aspect, the invention features a method for delivering a message unit to a destination network resource within a transport communications layer including the steps of configuring a mapping to the destination network resource based upon a source address of the message unit, and sending the message unit to the destination network resource based upon the mapping.

Embodiments of the invention may include one or more of the following features. The source address can be the source IP address of the message unit, or the source IP address and source port number of the message unit. The destination network resource can have a network resource address to which the message unit is sent. The network resource address might not be a valid Internet IP address, or might be a network address on a local area network. Configuring the mapping can include writing a table that maps the source address of the message unit and a network resource address for the destination network resource. The table can map a host address and the host port number for the destination network resource. The mapping can be configured to send message units to destination network resources based upon source addresses of the message units. The source addresses can be source IP addresses, or source IP addresses and source port numbers for the message units. Configuring the mapping can include recording the source IP address of a latest-received connection request. The message unit can be a single message sent during a connection-oriented transport session, and the session can be a TCP session. The message unit can be a datagram sent during a connectionless transport session, and the session can be a UDP session.

In general, in another aspect, the invention features a storage device tangibly storing a control program. The control program, when coupled to a control device, operates the control device to deliver a message unit to a destination network resource within a transport communications layer. The control program is configured to operate the control device to perform the functions of: configuring a mapping to the destination network resource based upon a source address of the message unit, and sending the message unit to the destination network resource based upon the mapping.

Advantages of the invention may include one or more of the following. Clients can access destination network resources through available transport protocols, even if those resources do not have proper network addresses, or where those addresses remain secret. Employees can access their own desktop computers, ordinarily not having proper IP addresses, over the Internet using existing remote access applications. By conducting remote access sessions through Internet transport protocols, existing Internet encryption protocols (e.g., SSL as part of HTTPS) can be added to such sessions without any modification of the underlying remote access applications. Clients can be allocated access to resources based solely upon their source IP address information. This can lessen the risk that others, not having that address information, will become aware of such resources or try to break into them. A client can be authorized access dynamically, so that a traveling employee can access his or her desktop computer from anywhere. The client does not require detailed information about the network location of the LAN resource: no translation details need to be given to the client, either in advance, or through the Internet, to allow access. The client can simply be told the address of a proxy server, but not the IP address of the destination network resource.

These and other features and advantages of the present invention will become more apparent from the following description, drawings, and claims.

DRAWINGS

FIG. 3 is a diagram of a address mapping table.

DESCRIPTION

Figure 1:
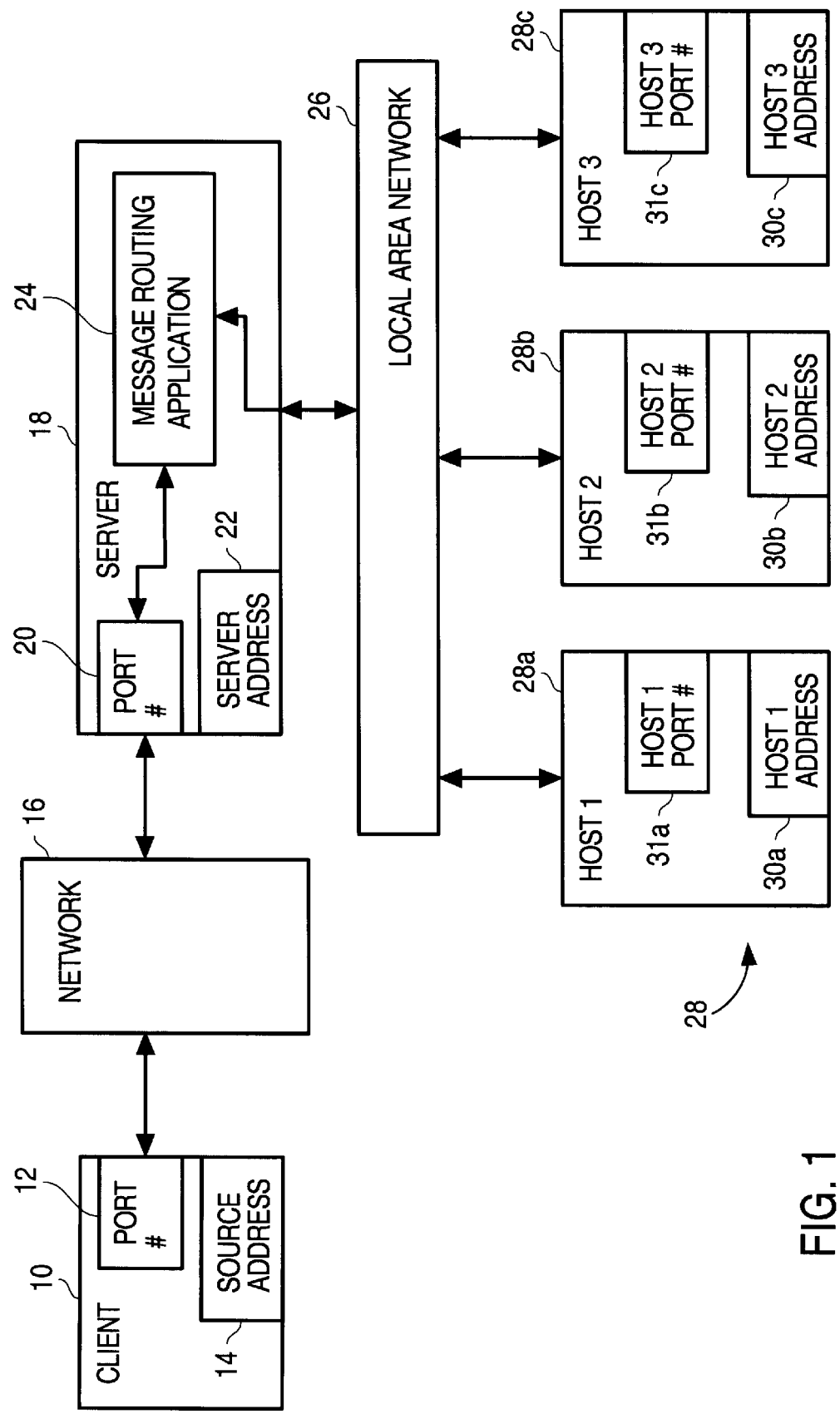
FIG. 1 is a schematic of a network having a server allowing access to LAN resources.

Referring to FIG. 1, client 10 connects through network 16 to server 18. Client 10 typically has source port number 12 (which can vary by message and by communication session) and source address 14, while server 18 has server port number 20 and server address 22. Client 10 can be, e.g., a traveling employee seeking direct access to his or her desktop computer at work, through an Internet connection. Network 16 can be the Internet (or, e.g., any Internet protocol (IP) network). The employee can access server 18 using a web browser, or other Internet communication software, using a computer (not shown) connected to the Internet via an Internet Service Provider (ISP). In this case, the ISP's source address is, for purposes of establishing a network connection, client source address 14. Where network 16 is an IP network, source address 14 is an IP address.

Local area network (LAN) 26 has one or more hosts 28a, 28b, and 28c that can represent various LAN resources. For example, host 28a can be the employee's desktop computer, having host destination address 30a with respect to LAN 26. Even though host 28a may not have a proper IP address for directly receiving and transmitting over the Internet, message routing application 24 within server 18 can route messages received from client 10 having source address 14 to the appropriate LAN resource (e.g., host 28a).

Figure 2:
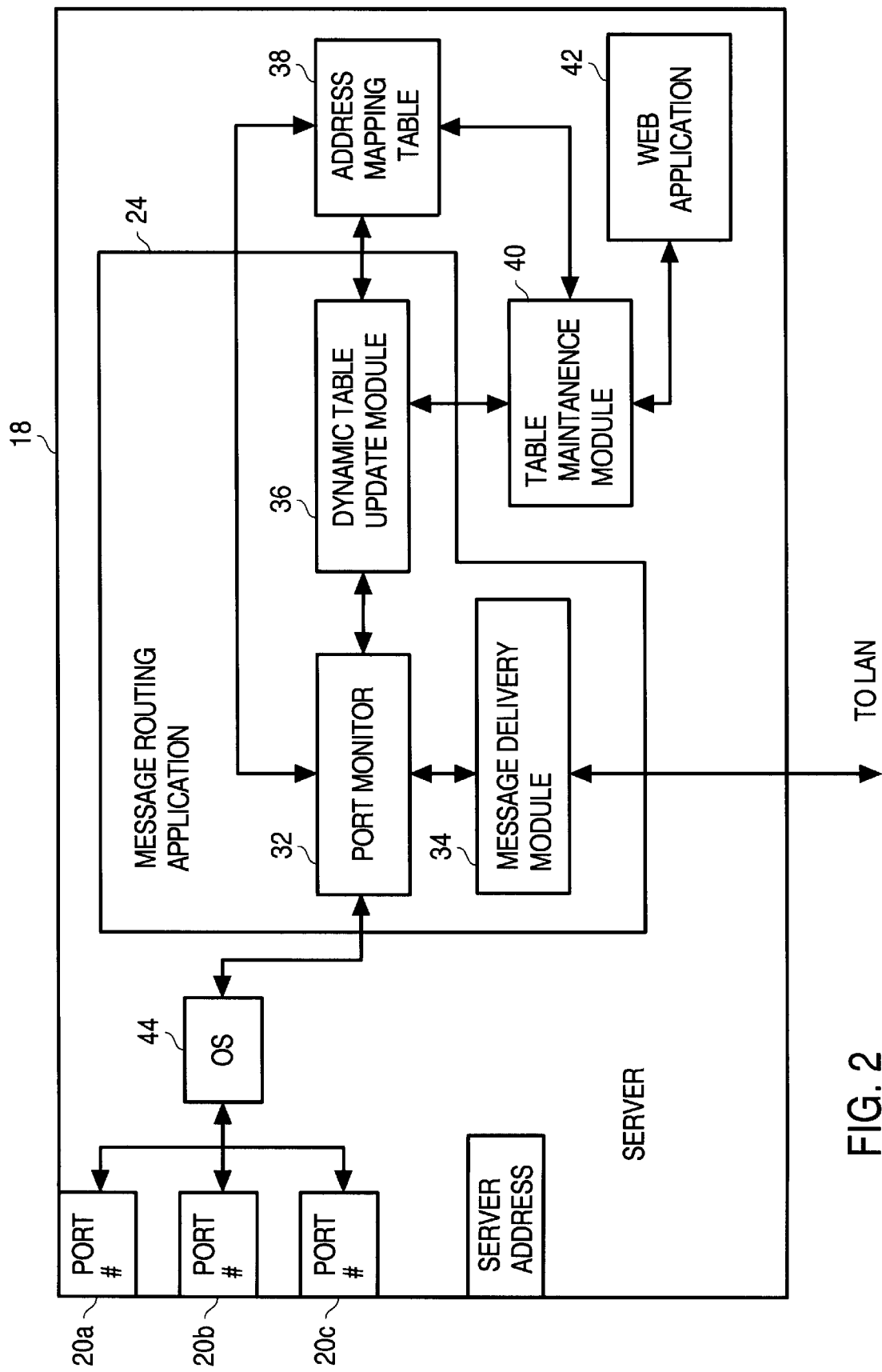
FIG. 2 is a schematic of a message routing application on the server for routing messages.

Referring also to FIG. 2, message routing application 24 includes port monitor 32, message delivery module 34 and dynamic table update module 36. Port monitor 32 monitors one or more selected ports 20a (20b, 20c, etc.) of server 18 for incoming messages. When a client 10 having source address 14 makes a request for a connection, port monitor 32 retrieves an entry in address mapping table 38 for that client's source address 14.

Referring also to FIG. 3, address mapping table 38 is structured with fields (shown in header 46) representing respectively: first field 48a—source IP address (or source host name) 14 of requesting client 10; second field 48b—destination IP address (or destination host name) 30; and third field 48c—destination port number (or service name) 31. Destination IP address 30 and destination port number 31 are of a particular LAN resource 28 (or other destination or host IP address), the host being the resource to which client 10 wishes to be connected. For example, entry 50a of address mapping table 38 maps source address 14a to address 30a and port 31a, of host 1 (item 28a). Port monitor 32 retrieves the mapping information corresponding to a particular source address 14 from address mapping table 38 and passes it to message delivery module 34.

Message delivery module 34 handles all further communications between client 10 and host destination address 30a, in a manner transparent to client 10. Operating system (OS) 44 of server 18 receives messages having particular source address 14 and source port number 12, and passes those messages to their corresponding message delivery module 34, which, because of the mapping information received from address mapping table 38, then delivers those messages via LAN 26 to host 28a at host destination address 30a.

Figure 4:
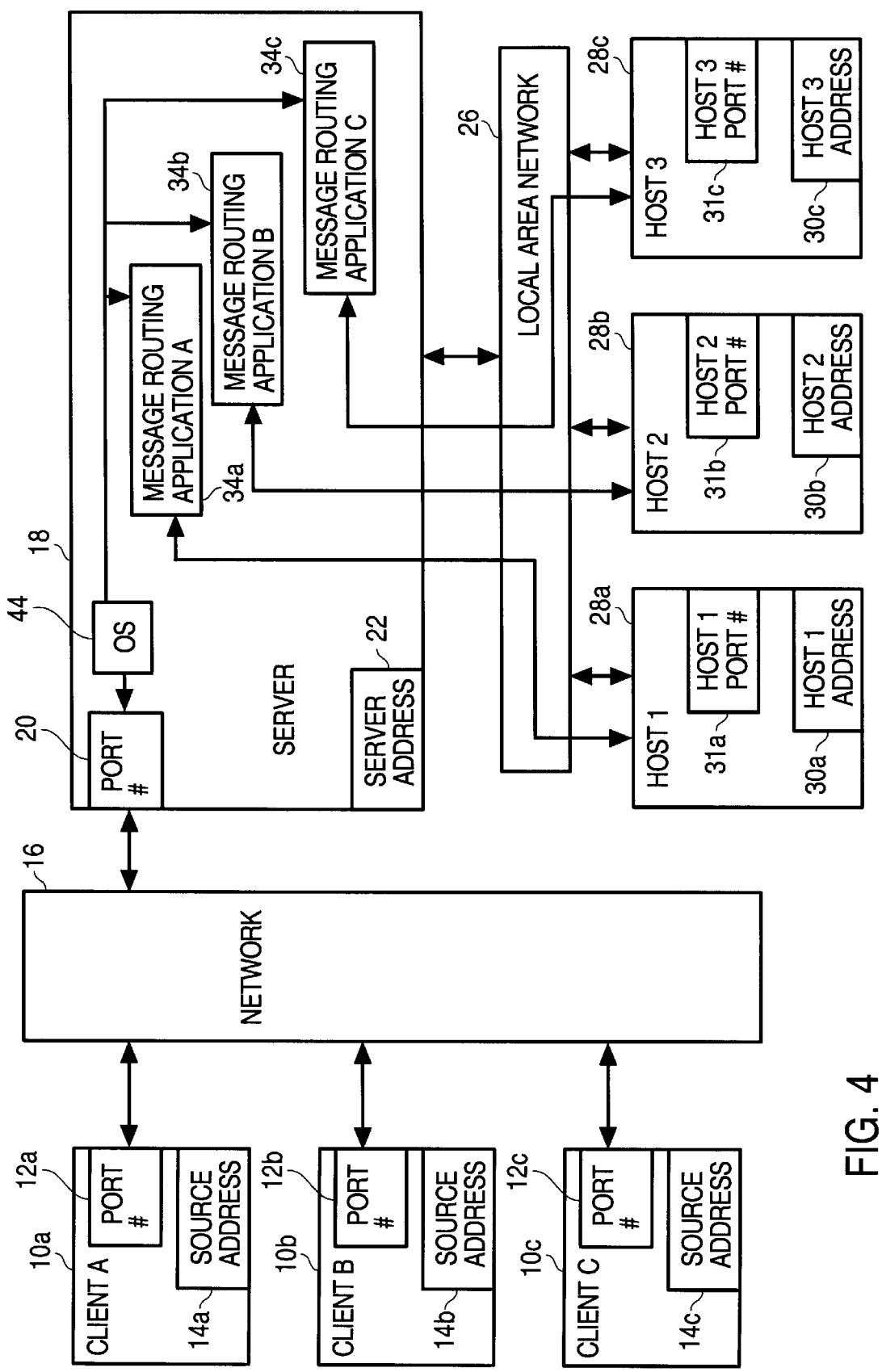
FIG. 4 is a schematic of multiple instances of a message routing application.

Depending upon the particular OS of server 18, message delivery module 34 may be configured as a single program that keeps track of all incoming messages mapped from a number of external clients 10 to a number of internal resources 28 having respective host destination addresses 30. Or, for example in the case of UNIX, message delivery module 34 may fork itself into a new instance for each new mapping, as shown in FIG. 4. Each forked instance 34a, 34b, and 34c of message delivery module 34 receives (from OS 44) only messages arriving respectively from clients 10a, 10b, 10c (having respective source addresses and port numbers). Each instance 34a, 34b, and 34c then delivers its respective messages to respective hosts 28a, 28b, and 28c. Another alternative, for a different type of OS (such as Windows), provides the message delivery module as a subroutine within message routing application 24, so that a new thread of the message delivery module subroutine is replicated for each mapping.

Regardless of method, message routing application 34 maintains separate communication sessions between particular clients 10 and particular hosts 28, based upon the source address 14 of clients 10. These sessions can be connection-oriented sessions (such as transport connection protocol (TCP) sessions) or can be connectionless sessions (such as unigram data protocol (UDP) sessions).

Address mapping table 38 can be updated periodically, e.g., by a LAN administrator using table maintenance module 40 (or the like) to add, edit, or delete individual mapping entries of address mapping table 38 so as to allow individual users to access particular hosts from external source addresses. For example, employees working from home through static source addresses could have those addresses entered into table 38, well in advance of any communication session between home and work. Or, address mapping table 38 can be updated dynamically, for example, at the start of a connection request, by, e.g., an employee seeking access to his or her desktop computer 28 while traveling, from a remote location having a previously unknown source address 14.

To dynamically route messages from a user from a new source address 14, the user can first access web application 42 provided by server 18 on the world wide web (WWW) of the Internet. Web application 42 can authenticate the user using any of a number of authentication methods. For examples of such methods, see co-pending U.S. application Ser. No. 08/928,360, filed on Sep. 12, 1997, now U.S. Pat. No. 6,202,156 entitled "Remote Access-Controlled Communications", incorporated herein by reference. Once the identity and authority of the user have been verified by web application 42, the user's information, including his or her source address 14, are passed to table maintenance module 40, which then passes that information directly into address mapping table 38. Or the information is passed to dynamic table update module 36 of message routing application 24. Dynamic table update module 36 then enters the new client mapping information into address mapping table 38, and passes the connection request onto port monitor 32 and message delivery module 34.

Where the first portion of the connection session is mediated over the world wide web of the Internet, using some variant of the HTTP protocol, Java application, ActiveX control, or another form of program or executable content sent over the public network, web application 42 may typically receive only a requesting client's source address 14, and possible certain other identifying information sent during the session (such as an employee's name and one-time password, for example). The initial HTTP session is stateless, so the requesting client 10, while having a persistent source address 14, will not necessarily have a persistent source port number 12. Therefore, address mapping table 38 contains only one entry for each source address. The entry represents the latest received connection request from that source address, since any previous entry for that address (from, for example, another employee calling into server 18 from the same proxy server as another employee) is first deleted. The deletion poses no difficulties, though, for proper message delivery, even if a number of clients (employees) are calling in from the same source address. Once message routing application 24 either looks up or modifies the users' information in address mapping table 38, retrieves the latest mapping for the source address, and causes message delivery module 34 to initiate a connection session between client 10 and host 28, client 10 typically starts using a persistent source port number 12, unique for that communication session from that source address 14. OS 44 automatically uses both the client's source address 14 and port number 12 to uniquely route messages received by server 18 to the appropriate forked instance, subroutine, or thread of message delivery module 34, which then uniquely handles that client's messages alone for that communication session. Another client, having the same source IP address 14 but a necessarily different port number 12, will be serviced by a different appropriate forked instance, subroutine, or thread of message delivery module 34.

Message routing application 24 transparently handles messages during a communication session and provides those messages to a particular destination network resource, based upon the origin (source address) of the messages. A user can simply connect to a web application 42, request a connection with a particular host 28, and the system can transparently handle the transport of messages to and from client 10 and host 28. In the case of remote access programs, after connection set-up, the remote access application will act as if it is simply remote accessing server 18, but will instead actually access host 28, via message routing application 24. Therefore, existing remote access programs can be used to access particular LAN resources without difficult alterations or reprogramming, and LAN administrators can securely limit who has access to particular resources, without passing any sensitive LAN address information over the public network.

Figure 5:
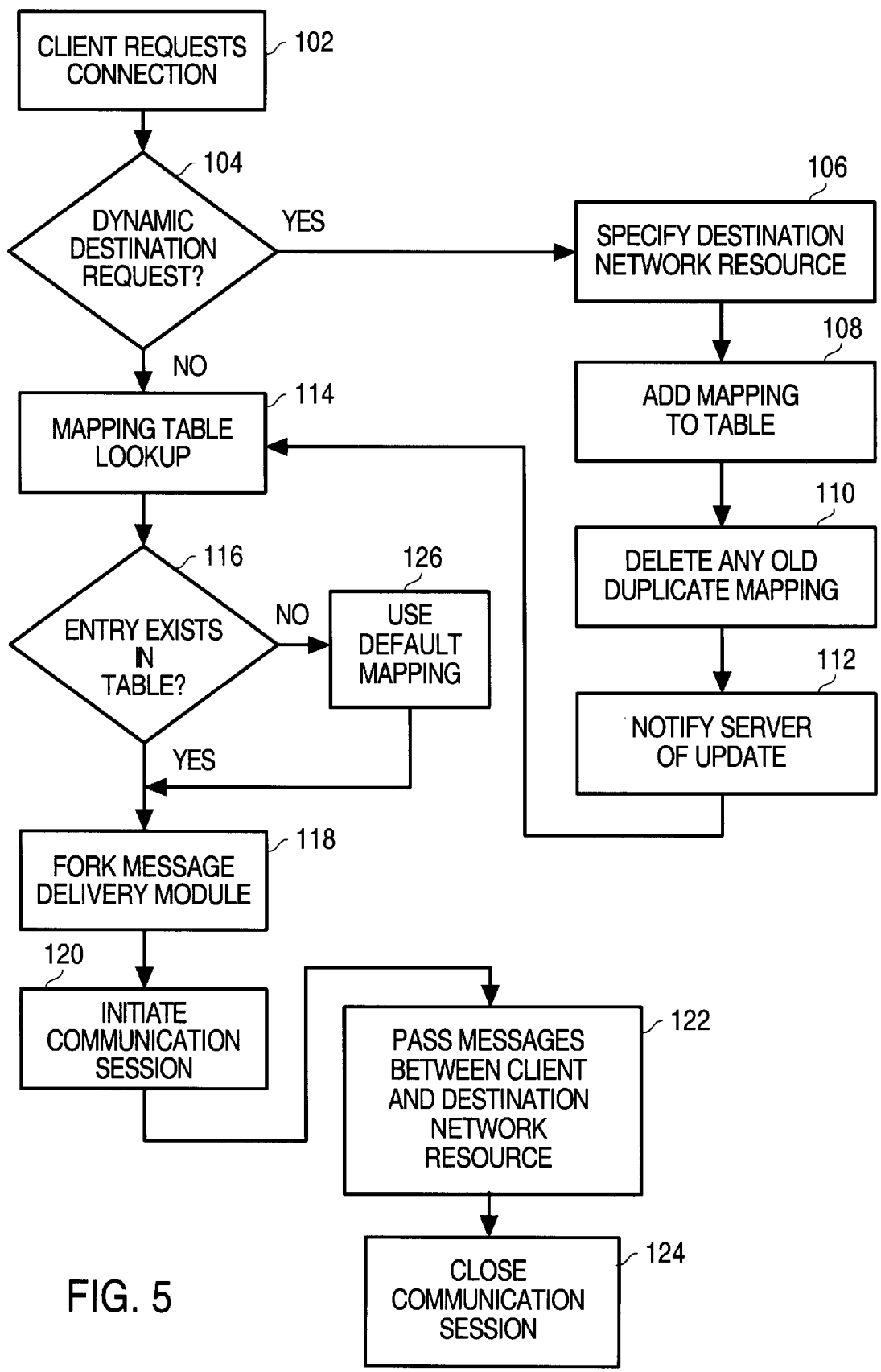
FIG. 5 is a flow chart for message routing between a client and a destination network resource.

Referring to FIG. 5, a message delivery method 100 begins when client 10 having source address 14 requests a connection to a destination network resource, e.g., host 28a (step 102). The initial configuration step can be managed by web application 42 (operating on server 18 or another web (HTTP) server 19, not shown). The initial configuration can be mediated through HTTP messages between client 10 and server 18 or 19. If the connection request is a dynamic destination request (step 104), in the sense that address mapping table 38 has not already been filled with a particular mapping for the particular source address 14 of client 10, then client 10 specifies the destination network resource it wishes to connect with (step 106), and that mapping is added to address mapping table 38 (step 108) (by, e.g., web application 42, table maintenance module 40, or dynamic table update module 36). Next, any old (duplicate) mapping existing between that source address 14 and any other destination network resource is deleted (step 110). Finally, server 18 and message routing application 24 are notified that the mapping has been updated (step 112).

If the connection request is not a dynamic destination request, or after the dynamic configuration has been completed, then address mapping table is accessed to find an appropriate mapping for source address 14 (step 114). If a mapping exists (e.g., in address mapping table 38) (step 116), then an instance of message delivery module 34 is forked (step 118), and a communication session between client 10 and destination network resource 28 is initiated (step 120). During the communication session, message delivery module 34 properly routes any incoming messages from client 10 having source address 14 to destination network resource 28 based upon the source addresses of the messages (step 122). Similarly, any messages returned by destination network resource 28 are properly addressed and returned by message delivery module 34 to client 10 via network 16. At the end of all message exchanges, the communication session is closed (step 124).

If a mapping does not exist (step 116), then a default mapping between the client's source address 14 and a default destination network resource is used (step 126) to address mapping table 38, and thereafter, steps 118 through 124 are executed as above. Steps 118 through 124 also are executed after notifying the server that the mapping has been updated (step 112).

Figure 6:
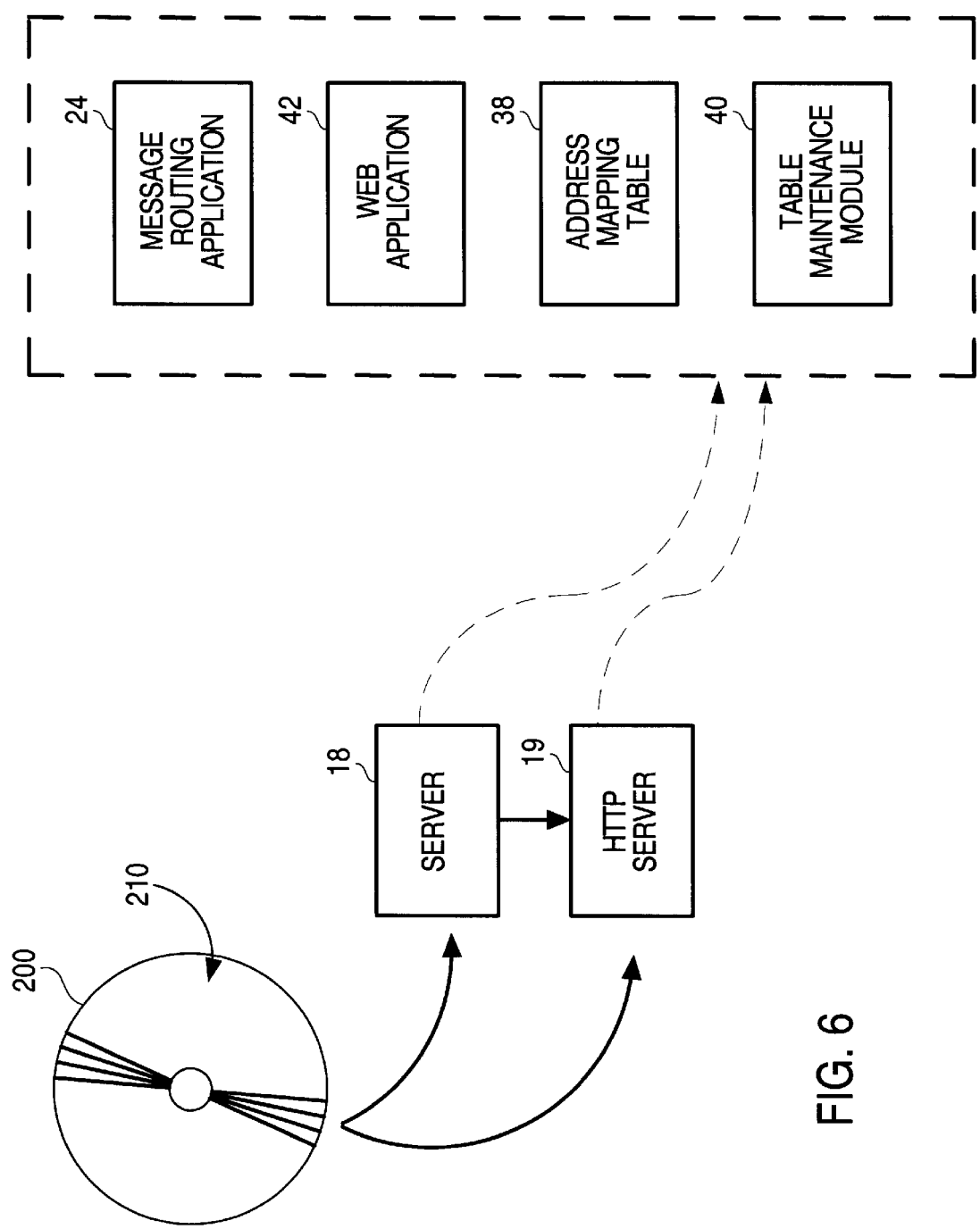
FIG. 6 is a block diagram of a machine-readable device encoded with software for generating a message routing application.

Referring to FIG. 6, software 210 for providing a message routing application can be placed upon any machine-readable device 210, such as a floppy disk, CD-ROM, removable hard drive, or other memory device, and can then be loaded into a server 18. Software 200 can include code which, when loaded into a server 18 (and/or a server's HTTP server 19), provides the application software needed to generate an appropriate message routing application 24, including as needed, a web application 42 for performing an initial configuration with a client 10 seeking to establish communications, an address mapping table 38, and table maintenance module 40.

Other embodiments are within the scope of the claims. For example, other methods for requesting a connection between a client and a host can be used, including other authentication applications. Connection requests can be sent to the message routing application in a number of ways, including passing semaphores, piping, or setting a file or at stored flag. Each client or host can be a computer, or any machine having a network address. The message routing application can be configured in a number of different ways to pass messages between client and host based upon the client's source address.

What is claimed is:

1. A computer implemented method for delivering a message to a network resource without opening said network resource to possible attack by unauthorized third parties, comprising:
    receiving a message from a source, said message specifying a source address associated with said source;
    determining, based upon said source address, a destination network resource for said message; and
    delivering said message to the destination network resource.

2. The method of claim 1, wherein the destination network resource has a network resource address associated therewith, and wherein said message does not specify said network resource address.

3. The method of claim 2, wherein said network resource address is not a valid IP address.

4. The method of claim 1, wherein determining the destination network resource comprises:
    accessing a set of mapping information, said mapping information specifying an association between said source address and the destination network resource.

5. The method of claim 4, wherein the destination network resource has a network resource address associated therewith, and wherein said mapping information comprises a mapping table, said mapping table comprising an entry which specifies an association between said source address and said network resource address.

6. The method of claim 4, further comprising:
    prior to receiving said message, receiving a request to associate said source address with the destination network resource; and
    processing said request to update said mapping information to associate said source address with the destination network resource.

7. The method of claim 6, wherein processing said request comprises:
    verifying that a sender of said request has proper authorization to associate said source address with the destination network resource; and
    updating said mapping information to associate said source address with the destination network resource only if the sender of said request has proper authorization.

8. An apparatus for delivering a message to a network resource without opening said network resource to possible attack by unauthorized third parties, comprising:
    a mechanism for receiving a message from a source, said message specifying a source address associated with said source;
    a mechanism for determining, based upon said source address, a destination network resource for said message; and
    a mechanism for delivering said message to the destination network resource.

9. The apparatus of claim 8, wherein the destination network resource has a network resource address associated therewith, and wherein said message does not specify said network resource address.

10. The apparatus of claim 9, wherein said network resource address is not a valid IP address.

11. The apparatus of claim 8, wherein the mechanism for determining the destination network resource comprises:
    a mechanism for accessing a set of mapping information, said mapping information specifying an association between said source address and the destination network resource.

12. The apparatus of claim 11, wherein the destination network resource has a network resource address associated therewith, and wherein said mapping information comprises a mapping table, said mapping table comprising an entry which specifies an association between said source address and said network resource address.

13. The apparatus of claim 11, further comprising:
    a mechanism for receiving, prior to receiving said message, a request to associate said source address with the destination network resource; and
    a mechanism for processing said request to update said mapping information to associate said source address with the destination network resource.

14. The apparatus of claim 13, wherein the mechanism for processing said request comprises:
    a mechanism for verifying that a sender of said request has proper authorization to associate said source address with the destination network resource; and
    a mechanism for updating said mapping information to associate said source address with the destination network resource only if the sender of said request has proper authorization.

15. A computer readable medium having stored thereon instructions which, when executed by one or more processors, cause the one or more processors to deliver a message to a network resource without opening said network resource to possible attack by unauthorized third parties, said computer readable medium comprising:
    instructions for causing one or more processors to receive a message from a source, said message specifying a source address associated with said source;
    instructions for causing one or more processors to determine, based upon said source address, a destination network resource for said message; and
    instructions for causing one or more processors to deliver said message to the destination network resource.

16. The computer readable medium of claim 15, wherein the destination network resource has a network resource address associated therewith, and wherein said message does not specify said network resource address.

17. The computer readable medium of claim 16, wherein said network resource address is not a valid IP address.

18. The computer readable medium of claim 15, wherein the instructions for causing one or more processors to determine the destination network resource comprises:

instructions for causing one or more processors to access a set of mapping information, said mapping information specifying an association between said source address and the destination network resource.

19. The computer readable medium of claim 18, wherein the destination network resource has a network resource address associated therewith, and wherein said mapping information comprises a mapping table, said mapping table comprising an entry which specifies an association between said source address and said network resource address.

20. The computer readable medium of claim 18, further comprising:

instructions for causing one or more processors to receive, prior to receiving said message, a request to associate said source address with the destination network resource; and instructions for causing one or more processors to process said request to update said mapping information to associate said source address with the destination network resource.

21. The computer readable medium of claim 20, wherein the instructions for causing one or more processors to process said request comprises:

instructions for causing one or more processors to verify that a sender of said request has proper authorization to associate said source address with the destination network resource; and instructions for causing one or more processors to update said mapping information to associate said source address with the destination network resource only if the sender of said request has proper authorization.

\* \* \* \* \*